US006359256B1

(12) United States Patent
Biermann et al.

(10) Patent No.: US 6,359,256 B1
(45) Date of Patent: Mar. 19, 2002

(54) CHANGING DEVICE FOR A LASER MACHINING TOOL

(75) Inventors: Stephan Biermann, Gernsbach; Peter Schubert, Gaggenau, both of (DE)

(73) Assignee: Precitec GmbH, Gaggenau-Bad Rotenfels (DE)

( * ) Notice: Subject to any disclaimer, the term of this patent is extended or adjusted under 35 U.S.C. 154(b) by 0 days.

(21) Appl. No.: 09/662,880

(22) Filed: Sep. 15, 2000

(30) Foreign Application Priority Data

Sep. 16, 1999 (DE) ......................................... 199 44 484

(51) Int. Cl.⁷ ............................................... B23K 26/00
(52) U.S. Cl. ................................................. 219/121.75
(58) Field of Search ..................... 219/121.6, 121.67, 219/121.68, 121.7, 121.83

(56) References Cited

U.S. PATENT DOCUMENTS

| | | | | |
|---|---|---|---|---|
| 3,266,393 A | * | 8/1966 | Chitayat | ..................... 396/315 |
| 4,661,680 A | * | 4/1987 | Swensrud | .............. 219/121.78 |
| 4,843,209 A | * | 6/1989 | Milligan | ................ 219/121.63 |
| 5,101,089 A | | 3/1992 | Bortolotto et al. | |
| 5,126,532 A | * | 6/1992 | Inagawa et al. | ......... 219/121.7 |
| 5,376,061 A | * | 12/1994 | Suzuki | ........................ 483/13 |
| 5,498,849 A | * | 3/1996 | Isshiki et al. | .......... 219/121.64 |
| 6,204,473 B1 | * | 3/2001 | Legge | ................... 219/121.67 |

FOREIGN PATENT DOCUMENTS

| | | |
|---|---|---|
| DE | 4040554 | 6/1993 |
| DE | 29507189 | 4/1995 |
| DE | 19655127 | 3/1999 |
| EP | 0779125 | 6/1997 |
| JP | 10-6062 | 1/1998 |

* cited by examiner

Primary Examiner—Samuel M. Heinrich

(57) ABSTRACT

The invention relates to a changing device for a lens holder of a connecting head for a laser machining tool. The lens holder includes a focusing optical system arranged therein. The changing device has at least one station including a holder for gripping and holding a lens holder and an actuator for engaging a fastener provided on the connecting head. The fastener fixes and/or releases the lens holder from the connecting head. Each station may further include structure for installing/removing a cutting nozzle, cleaning a cutting nozzle, and/or inspecting the optical system or cutting nozzle.

27 Claims, 2 Drawing Sheets

CHANGING DEVICE FOR A LASER MACHINING TOOL

BACKGROUND OF THE INVENTION

1. The invention relates to a changing device for a lens holder of a connecting head for machining a workpiece by means of a laser beam.

2. Description of the Relevant Art

DE 295 07 189 U1 has already disclosed a connecting head for machining a workpiece by means of a laser beam. The laser beam is focused with the aid of a focusing optical system present in a connecting head. The laser beam emerges through a cutting nozzle after traversing the focusing optical system. In this case, the focusing optical system is fitted, such that it can be adjusted in the direction of and transverse to its optical axis, on a lens holder. The lens holder is a withdrawable part and can be inserted into a connecting head housing and withdrawn therefrom. In order to facilitate the machining of the workpiece by means of a laser beam, a process gas emerges under pressure together with the laser beam through the cutting nozzle fitted on the connecting head.

Such connecting heads are used, for example, in laser cutting installations. The laser cutting is extremely flexible by comparison with rival separating methods (punching, sawing, etc.). Changing to new cutting contours, materials or workpiece thicknesses can be performed in this case comparatively quickly and in an automated fashion. A plurality of machine parameters are frequently changed for this purpose, for example the contour program, the laser output, the feed rate, the type and pressure of the process gas, the distance between the connecting head and workpiece, and the focusing position. In addition to matching these parameters, it is, in particular, also frequently necessary to change the focal length of the focusing optical system, the nozzle diameter, the nozzle type etc., thus giving rise to the need to change the focusing optical system and the cutting nozzle.

Since the focusing optical system and the cutting nozzle are subject to wear in normal use, ensuring a high process quality requires regular inspection, possibly with subsequent exchange, or regular exchange of the focusing optical system and cutting nozzle. Both the workpiece to be machined and the laser cutting installation could be damaged by worn or damaged focusing optical systems or cutting nozzles.

In order to permit changing of the focusing optical system, it is known from German Patent Application DE 196 55 127 to integrate in the connecting head a changing device for focusing optical systems, in order to be able to arrange in the machining beam path focusing optical systems of different focal lengths at different distances from the cutting nozzle. The individual focusing optical systems are arranged in this case either on turntables or on slides which are situated in different planes perpendicular to the machining beam path.

JP 10-006 062 discloses a changing device for cutting nozzles of a laser machining head in which a plurality of cutting nozzles are accommodated in a magazine. So as to hold the cutting nozzles in the magazine, the latter has appropriate holes behind the edges of which a flange of the respective cutting nozzle engages in each case when the latter is inserted with a slight pressure. The cutting nozzle is held on the connecting head with the aid of appropriate locking means such that after a cutting nozzle has been set down in the magazine another cutting nozzle can be taken from the magazine with the aid of the connecting head.

In a further known changing device for cutting nozzles (U.S. Pat. No. 5,101,089), it is possible to exchange various cutting nozzle tips which can be held by a bayonet catch on the nozzle body of a connecting head or in a holding device of a magazine. For the purpose of changing the cutting nozzle tip, the latter is pushed into a corresponding holding space and firstly fastened in the holding device by rotating the connecting head such that further rotation releases the bayonet connection between the cutting nozzle tip and the connecting head or the nozzle body. The connecting head can then be withdrawn in order to take another cutting nozzle tip from the magazine by firstly rotating the connecting head to make the bayonet connection between the connecting head and cutting nozzle tip, and then releasing the bayonet connection between the cutting nozzle tip and holding device. When locking and unlocking the bayonet connections, it is also possible in this case to rotate the holding device by means of a motor instead of the connecting head.

SUMMARY OF THE INVENTION

The object of the invention is to provide a changing device which renders it possible to match the connecting head of a laser machining installation quickly and reliably to the particular machining task.

Thus, the invention provides that the changing device for a lens holder of a connecting head for machining a workpiece by means of a laser beam has at least two magazine stations, of which each has a holding device for gripping and holding a lens holder, and an actuating device for fastening means which are provided on the connecting head and fix the lens holder, a locking and unlocking device advantageously being provided as an actuating device.

This renders possible quick and automated changing of a focusing optical system arranged in a lens holder, without the need to undertake substantial changes for automation on the connecting head itself. Particularly when use is made of a connecting head which has a focusing optical system preadjusted in the direction of the optical axis and perpendicular thereto, and which is provided for manually changing the focusing optical system, automatic changing is possible with the aid of the changing device according to the invention without the need to undertake essential changes at the connecting head, since the changing device has all the means required for changing.

In order to achieve particularly flexible automation, it is possible when changing the focusing optical system simultaneously to undertake a change to the focal position and/or the focal length. However, in most cases this also requires simultaneous exchange of the cutting nozzle, since in some circumstances a change in the focal length and/or the focal position can drastically change the laser beam radius in the cutting nozzle region, or the beam caustic. If the cutting nozzle and the laser beam caustic are not coordinated with one another, there can be a severe worsening of the machining quality. In the worst case, the cutting nozzle can burn up and the workpiece to be machined can be damaged.

In order to take precautions here, it is possible for the nozzle opening generally to be selected to be so large that the machining beam always passes acceptably through the nozzle opening independently of the focusing optical systems used. However, this increases the gas consumption and, moreover, does not achieve the optimum possible machining result in many cases.

In order to provide a remedy here, it is possible in principle to provide on the changing device according to the invention further magazine stations at which cutting nozzles can be changed automatically. However, in order to carry out automatic changing of the focusing optical system and another function element of the connecting head, particularly the cutting nozzle, particularly quickly, it is provided in the case of an advantageous embodiment of the invention that provided at each magazine station are a further holding device for gripping and holding a further function element and a further actuating device for fastening means which fix the further function element on the connecting head, with the result that the lens holder and the further function element at the same magazine station can be removed from the connecting head or fitted thereon, the further holding device being constructed, in particular, for gripping and holding a cutting nozzle.

The invention thus renders it possible to change two function elements of a connecting head for a laser machining installation at a single magazine station of a changing device. The connecting head therefore need only be moved to a first empty magazine station, where the function elements to be changed, that is to say the lens holder and the cutting nozzle, are gripped by the changing device and detached from the connecting head. The connecting head is then moved to another magazine station where the desired mutually coordinated function elements, that is to say the lens holder with the focusing optical system required for further machining, and the cutting nozzle coordinated therewith are mounted. The insertion of the required focusing optical system and the fitting of the cutting nozzle are performed there.

Thus, the construction, according to the invention, of the magazine stations of the changing device renders it possible to change the focusing optical system and the associated cutting nozzle in an automated fashion at a single magazine station, resulting thereby in a space-saving design of the changing device and in simple control of the changing operation.

In an expedient development of the invention, it is provided that provided for gripping and holding the cutting nozzle is a gripper which acts on the outer circumference of the latter and can be rotated about an axis of rotation coaxial with the axis of a gripped cutting nozzle, in order to detach a gripped cutting nozzle from the connecting head, or fasten it on the latter.

It is particularly expedient when the gripper is constructed as a screw-in and screw-out device.

Since the individual function elements and, in particular, the focusing optical system are subject to wear and/or can be damaged during the machining of workpieces, it is particularly expedient for each magazine station to be assigned a monitoring device in order to check the state of a function element, in particular the focusing optical system, removed from a connecting head. It is particularly expedient in this case for the monitoring device to be an optical sensor which supplies an outward signal from which the state and/or the position of the monitored function element can be derived.

It is possible with the aid of the monitoring device provided on the changing device according to the invention to establish whether a function element is still in an acceptable state after use in the laser cutting installation, in order to be held ready for further use, or whether it must be repaired or replaced. In particular, it is possible to use an optical sensor to detect the presence or absence of a focusing optical system, and/or the degree of contamination thereof and/or its focal position. In particular, it can be established in monitoring or detecting the state of a cutting nozzle whether the nozzle opening is still round.

In order to lengthen the service life of function elements of a connecting head which become contaminated while being used in a laser cutting installation, and to improve their readiness for use, it is provided in an expedient development of the invention that a cleaning device for a function element, in particular a brush device for cleaning cutting nozzles, is arranged at each magazine station.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The invention is explained below by way of example with the aid of the drawings, in which.

DETAILED DESCRIPTION OF THE INVENTION

In the different figures of the drawings, mutually corresponding components are provided with the same reference symbols.

Figure 1:
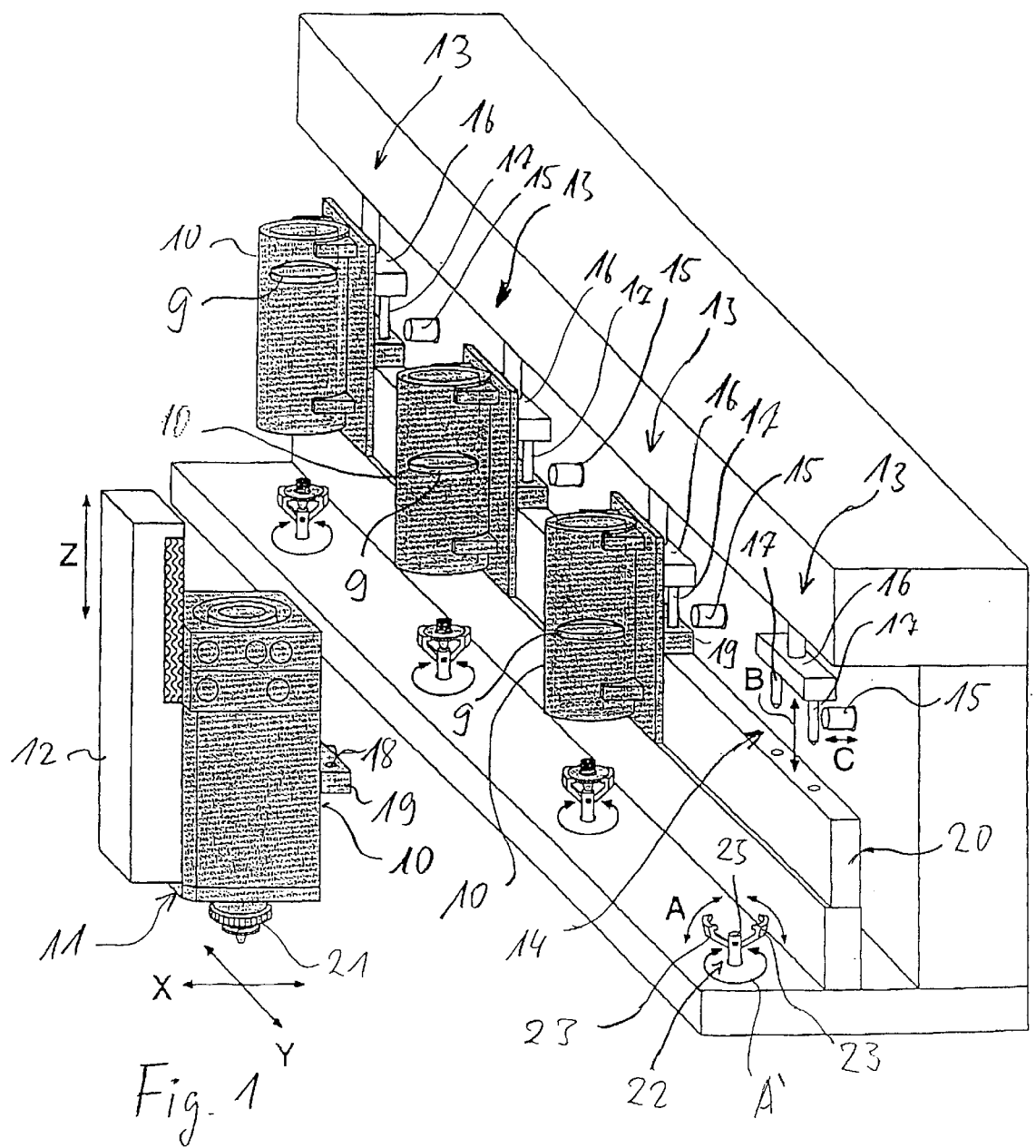
FIG. 1 shows a greatly simplified perspective view of a changing device according to a first exemplary embodiment of the invention.

FIG. 1 shows a changing device according to the invention for lens holders 10, having a focusing optical system 9 of a connecting head 11 of a laser machining installation for machining a workpiece by means of a laser beam. The connecting head 11 is fitted on a machining arm 12 (indicated only in a purely diagrammatic fashion) of a gantry installation (not illustrated in more detail) of a laser machining installation. Via the machining arm 12, the gantry installation implements the displacement of the connecting head 11 in all three spatial directions, that is to say in the X, Y and Z directions, as indicated by arrows in FIG. 1.

In the exemplary embodiment illustrated, the changing device has four magazine stations 13 but, depending on the number of function elements to be held ready, it can also comprise a greater or lesser number of magazine stations 13. Each magazine station 13 has a holding device 14 for gripping and holding a lens holder 10 and a locking and unlocking device 15. The locking and unlocking device 15 is an actuating device for fastening means which are provided on the connecting head 11 for fixing the lens holder 10. The holding device 14 comprises a fixing device 16 which can be displaced vertically in the direction of the double arrow B. The fixing device 16 has two fixing pins 17, for the purpose of gripping and holding a lens holder 10 in the magazine station 13. The two fixing pins 17 cooperate with corresponding holes 18 in a gripper element 19 on the lens holder 10. Moreover, each holding device 14 of the magazine stations 13 is assigned a support surface section on a support rail 20. The support rail 20 which is common to all the magazine stations. A lens holder 10, with its gripper element 19 and its front surface bears on the support rail 20 when it is arranged and held in one of the magazine stations 13.

The configuration of the holding device 14, that is to say the configuration of its gripper and support elements, depends substantially on the configuration of the lens holder 10 used, and can be varied in multifarious ways. For example, it is also conceivable to use gripping and fixing pincers to grasp the gripper element 19. It is also possible to use an actuating device adapted to the means respectively provided for locking and/or fastening the lens holder 10 on the connecting head 11 instead of the illustrated locking and unlocking device 15. The illustrated locking and unlocking device 15 includes a pin which can be displaced in the direction of the double arrow C.

In order to remove or install a cutting nozzle 21 on the connecting head 11, each magazine station 13 has a clamping mechanism, for example a gripper 22 each gripper 22 includes a plurality of, gripper arms 23, such as three gripper arms 23, for gripping and holding the cutting nozzle 21. The gripper arms 23, which can act in a fashion distributed over the outer circumference of the cutting nozzle 21, can be pivoted between a gripped and a released position. In order to detach the cutting nozzle 21 from the connecting head 11 or to fasten it thereon, the gripper 22 can be rotated about a vertical axis in both directions of rotation, as indicated by the double arrow A'. The clamping mechanism 22 can also be constructed in a different way in order to grip the cutting nozzle 21 or hold it clamped.

Figure 2:
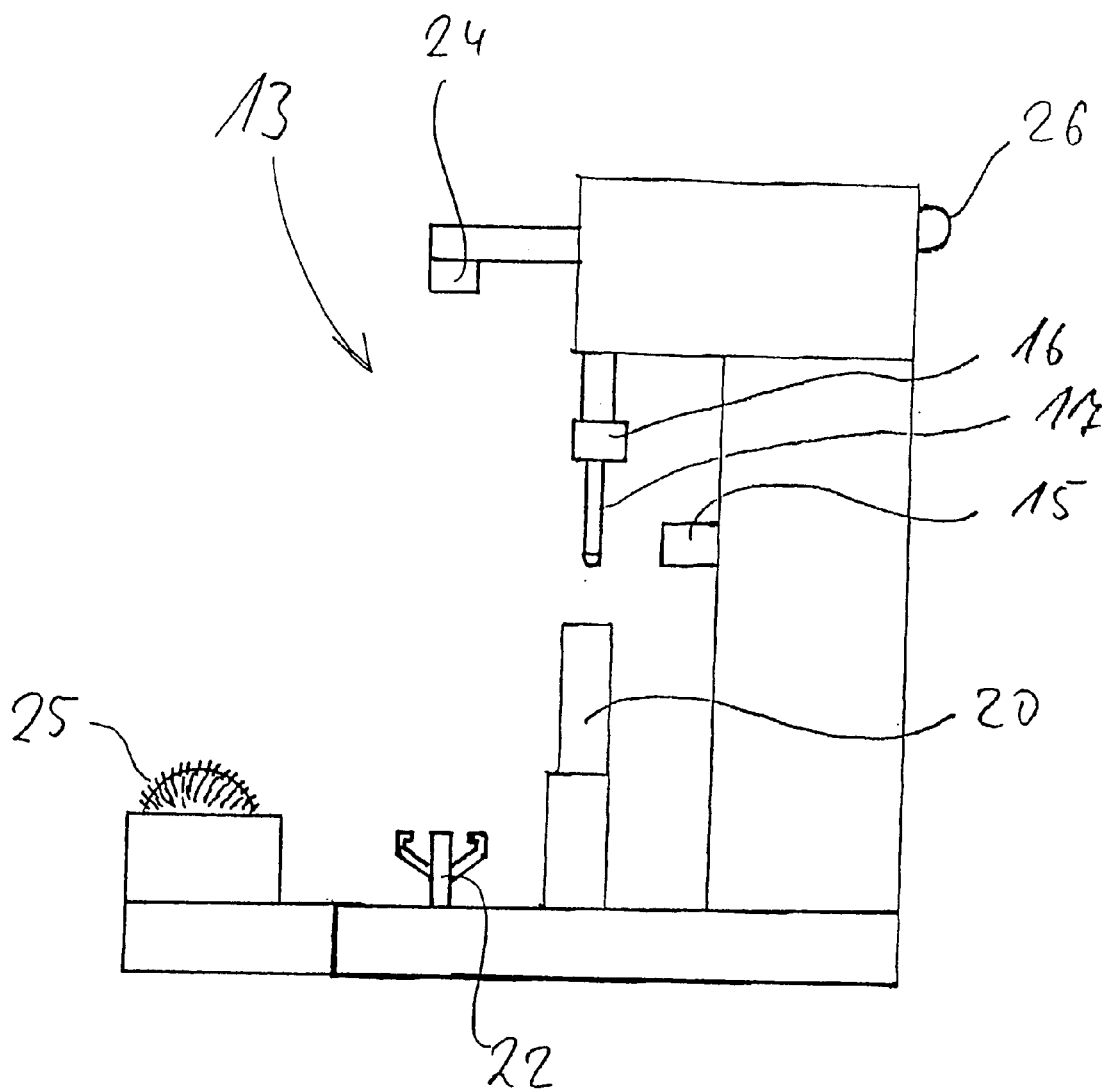
FIG. 2 shows a side view of another configuration of the invention.

As shown in FIG. 2, in a further exemplary embodiment of the changing device according to the invention, a monitoring device 24 which includes, an optical sensor, is provided at each magazine station 13. In the simplest case, the optical sensor can be provided as a light barrier which operates by reflection and whose reflector is formed in each case by the individual lens surfaces of a focusing optical system which is to be monitored or to be checked. It is also possible to provide for the cutting nozzle 21, a monitoring device to established whether the nozzle opening is still round or not. An optical sensor arrangement can be provided for this purpose as well.

Furthermore, the changing device can have a brush device 25 which has one or more brushes for cleaning the cutting nozzles 21. It is possible in this case for each magazine station 13 to be assigned a dedicated brush device 25. However, it is also conceivable to provide a common brush device 25 for the entire changing device.

Moreover, for the purpose of cleaning the cutting nozzles 21, it is possible to provide each clamping mechanism or each gripper 22 with a compressed air nozzle. The compressed air nozzle would be integrated in the axis of the gripper 22, for example, for and would clean the cutting nozzle 21 with the aid of compressed air.

The changing device according to the invention operates in the following way.

If the aim is to change the focusing optical system 9 of a connecting head 11 and the cutting nozzle 21 thereof after a machining period, the connecting head 11 is guided by the machining arm 12 of the gantry installation to a free magazine station 13 of the changing device. If, in this case, as shown in FIG. 2, the changing device has a brush device 25, on the way to the magazine station 13, the cutting nozzle 21 can firstly be cleaned from the outside with the aid of the brush device 25, in order to remove contaminants deposited thereon during the workpiece machining.

Consequently, the connecting head 11 is moved into a position at the magazine station 13 in which the gripper 22 can grip the cutting nozzle 21 on the outer circumference, and in which the lens holder 10 bears with its front surface and the underside of its gripper element 19 against the support rail 20. The fixing device 16 is moved downwards thereupon, so that the fixing pins 17 engage in the holes 18 on the gripper element 19 and therefore hold the lens holder 10 fast in the magazine station 13. At the same time, the cutting nozzle 21, which is gripped by the gripper 22, is detached from the connecting head 11 by virtue of the fact that, depending on the type of fastening of the cutting nozzle 21, the latter is screwed off or withdrawn after disconnection of a bayonet catch. After the fixing of the lens holder 10, the locking means which secure it on the connecting head 11 are unlocked with the aid of the locking and unlocking device 15. Thereupon, the connecting head 11 can be moved out of the magazine station 13, with the result that the lens holder 10 is removed from the connecting head 11 together with the focusing optical system 9 and the cutting nozzle 21 adapted thereto.

The connecting head 11 is thereupon moved to another magazine station 13 having a focusing optical system 9 and a cutting nozzle 21 which are suitable for the subsequent machining operation. Here, in reverse sequence, the lens holder 10 is firstly inserted into the connecting head 11. The lens holder 10 is then locked to the connecting head 11 with the aid of the locking and unlocking device 15. Later, the lens holder is released from the holding device 14 by withdrawing the fixing pins 17 of the fixing device 16 from the holes 18 of the gripper element 19. At the same time as the insertion of the lens holder 10, the corresponding cutting nozzle 21 is fitted from below with the aid of the gripper 22.

After the gripper arms 23 have also been detached from the cutting nozzle 21, the connecting head 11, equipped with a new focusing optical system 9 and new cutting nozzle 21 is ready for further laser machining of a workpiece.

After the two function elements, that is to say the focusing optical system 9 and the cutting nozzle 21, have been removed, the states of the function elements are checked with the aid of the monitoring device 14. If it is established during checking that it is necessary to exchange or clean the focusing optical system 9 and/or the cutting nozzle 21, this can be indicated. An indication may be given by an appropriate indicating device, for example by a red light-emitting diode 26 or the like.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A device for modifying a laser machining tool, with the laser machining tool including a head for carrying a lens holder, wherein the lens holder is attached to the head by a fastener, said device comprising:

at least one station;

said at least one station including a holder, said holder for gripping and holding a lens holder; and said at least one station including an actuator, said actuator for interacting with the fastener to attach a lens holder to, or detach a lens holder from, a head of a laser machining tool.

2. The device according to claim 1, wherein the head of the laser machine tool also carries a cutting nozzle, and wherein said device further comprises:

a gripper provided at said at least one station, said gripper for engaging a cutting nozzle.

3. The device according to claim 2, wherein said gripper is rotatable in a first direction to remove a cutting nozzle from a head of a laser machine tool.

4. The device according to claim 3, wherein said gripper is also rotatable in a second direction to attach a cutting nozzle to a head of a laser machine tool.

5. The device according to claim 2, further comprising:
a cleaner provided at said at least one station, said cleaner for cleaning a cutting nozzle.

6. The device according to claim 5, wherein said cleaner includes a brush.

7. The device according to claim 1, further comprising:
a monitoring device provided at said at least one station, said monitoring device evaluating a condition of a lens of a lens holder.

8. The device according to claim 7, wherein said monitoring device is an optical sensor.

9. The device according to claim 7, further comprising:
an LED communicating with said monitoring device to indicate an evaluated condition of the lens of the lens holder.

10. The device according to claim 1, wherein said at least one station includes a first station and a second station, with each of said first station and said second station including a respective holder and a respective actuator.

11. The device according to claim 2, wherein said at least one station includes a first station and a second station, with each of said first station and said second station including a respective holder, a respective actuator, and a respective gripper.

12. The device according to claim 5, wherein said at least one station includes a first station and a second station, with each of said first station and said second station including a respective holder, a respective actuator, a respective gripper, and a respective cleaner.

13. The device according to claim 7, wherein said at least one station includes a first station and a second station, with each of said first station and said second station including a respective holder, a respective actuator, and a respective monitoring device.

14. A method of operating device for modifying a laser machining tool, said method comprising the steps of:
providing a laser machining tool including a head and a first lens holder attached to the head by a fastener;
providing a first station;
moving the laser machining tool to the first station;
gripping and holding the first lens holder of the laser machining tool at the first station;
interacting an actuator of the first station with the fastener;
detaching the first lens holder from the head; and
removing the laser machining tool, absent the first lens holder, from the first station.

15. The method according to claim 14, further comprising the steps of:
providing a second station, having a second lens holder held thereby;
moving the laser machining tool to the second station;
attaching the second lens holder to the head of the machining tool; and
removing the laser machining tool, with the second lens holder attached thereto, from the second station.

16. The method according to claim 15, further comprising the steps of:
providing the laser machining tool with a first cutting nozzle; and
removing the first cutting nozzle from the laser machining tool while the laser machining tool is at the first station.

17. The method according to claim 16, further comprising:
cleaning the first nozzle at the first station.

18. The method according to claim 16, further comprising:
providing a monitor at the first station; and
evaluating a condition of the first cutting nozzle.

19. The method according to claim 16, wherein said step of removing the first cutting nozzle includes:
providing a first gripper at the first station; and
engaging the first gripper to the first cutting nozzle.

20. The method according to claim 19, wherein said step of removing the first cutting nozzle further includes:
rotating the first gripper about an axis of the first cutting nozzle, while said first cutting nozzle is engaged by the first gripper.

21. The method according to claim 16, further comprising the steps of:
providing a second cutting nozzle at the second station; and
installing the second cutting nozzle on the laser machining tool, while the laser machining tool is at the second station.

22. The method according to claim 14, further comprising:
providing a monitor at the first station; and
evaluating a condition of a lens of the first lens holder.

23. The method according to claim 15, further comprising:
providing a first monitor at the first station;
evaluating a condition of a lens of the first lens holder using the first monitor;
providing a second monitor at the second station; and
evaluating a condition of a lens of the second lens holder using the second monitor.

24. Changing device for a lens holder (10) of a connecting head (11) for machining a workpiece by means of a laser beam, having at least two magazine stations (13), of which each has:
a holding device (14) for gripping and holding a lens holder (10); and
an actuating device (15) for fastening means which are provided on the connecting head (11) and fix the lens holder (10); characterized in that provided at each magazine station (13) are a further clamping or holding device (22) for gripping and holding a further function element (21) and a further actuating device (23) for fastening means which fix the further function element (21) on the connecting head (11), with the result that the lens holder (10) and the further function element (21) at the same magazine station (13) can be removed from the connecting head (11) or fitted thereon.

25. Changing device according to claim 24, characterized in that the further holding device (22) is constructed for gripping and holding a cutting nozzle (21).

26. Changing device according to claim 25, characterized in that provided for gripping and holding the cutting nozzle (21) is a gripper (22) which acts on the outer circumference of the latter and can be rotated about an axis of rotation coaxial with the axis of a gripped cutting nozzle (21), in order to detach a gripped cutting nozzle (21) from the connecting head (11), or fasten it on the latter.

27. Changing device according to claim 26, characterized in that the gripper (22) is constructed as a screw-in and screw-out device.

* * * * *